Jan. 19, 1965 J. B. PARSONS 3,166,052
THERMO-SHUTTER
Filed Aug. 6, 1963 2 Sheets-Sheet 1
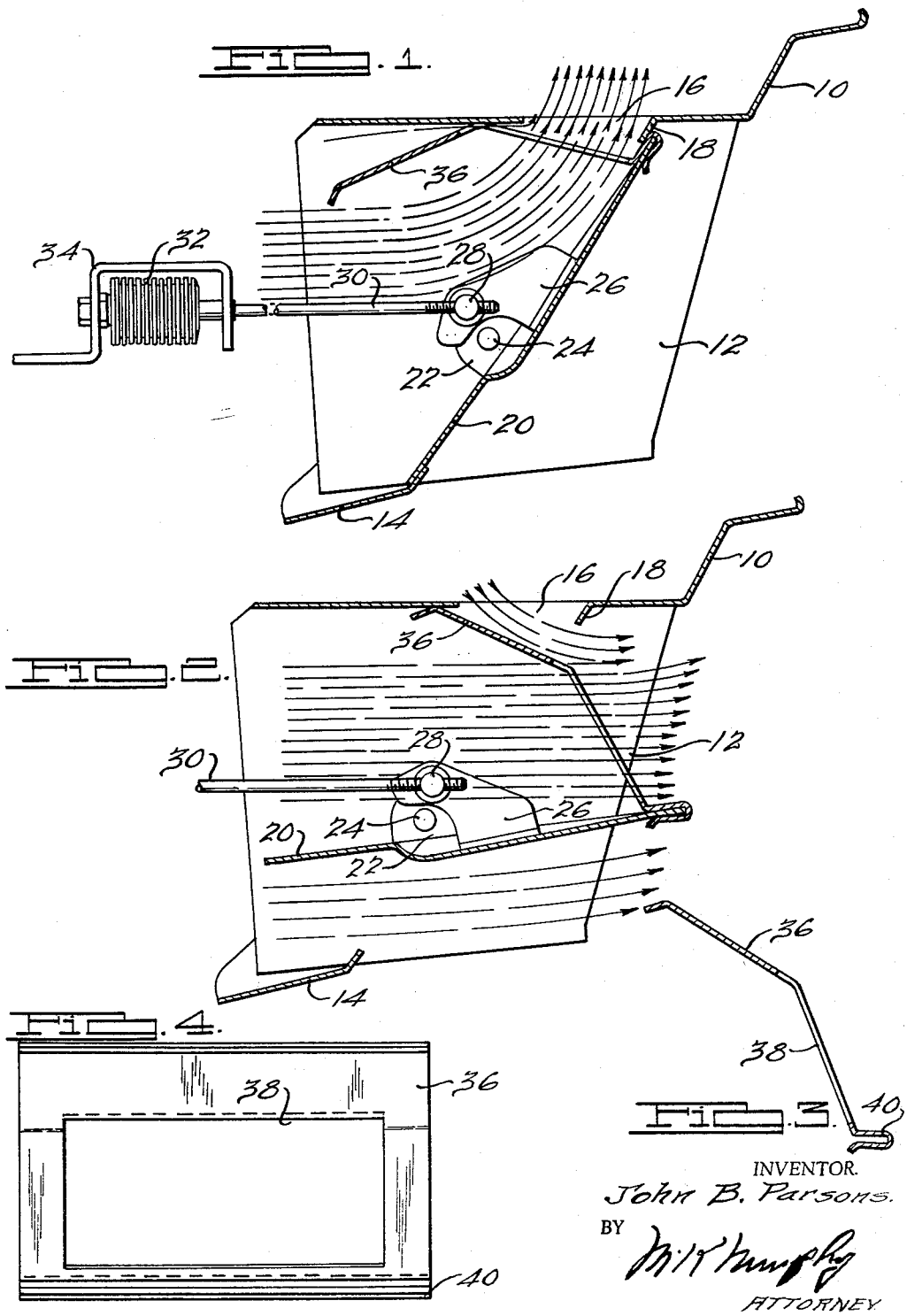
INVENTOR.
John B. Parsons.
BY
ATTORNEY Jan. 19, 1965  J. B. PARSONS  3,166,052
THERMO-SHUTTER
Filed Aug. 6, 1963  2 Sheets-Sheet 2
Fig. 5
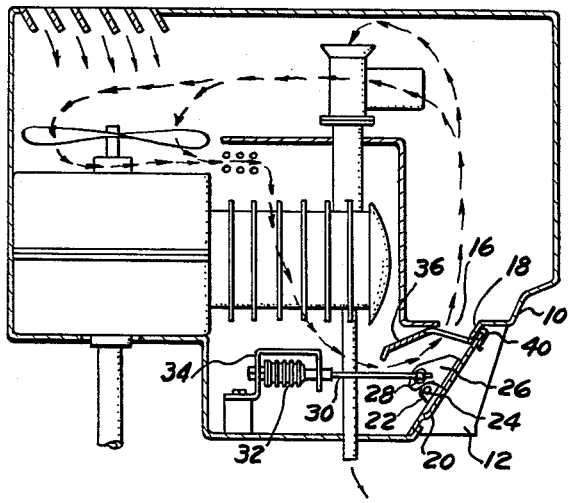
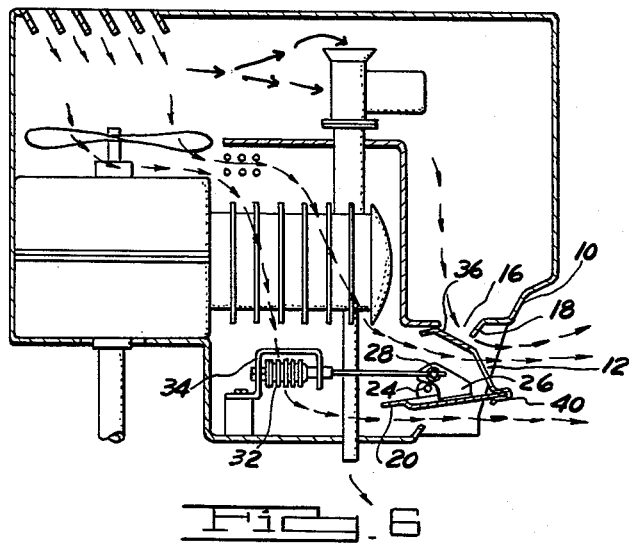
Fig. 6
INVENTOR.
JOHN B. PARSONS
BY
ATTORNEY

United States Patent Office 3,166,052
Patented Jan. 19, 1965

3,166,052
THERMO-SHUTTER
John B. Parsons, 1210 River Road, Maumee, Ohio
Filed Aug. 6, 1963, Ser. No. 300,249
8 Claims. (Cl. 123—41.05)

This invention relates to air flow control devices for engines, especially air cooled engines and particularly automobile engines such as those in the popular "Corvair" automobile.

The Corvair engine is mounted in the rear of the vehicle and has two carburetors, one on each side. For quick warmup of the engine, provision is made for circulating the air supplied by a powerful fan disposed on top of the cylinder block around the carburetors, oil cooler and oil filter. This stream of air is drawn from an area forward of the engine such that it circulates over the entire engine and around the cylinders before it reaches the carburetors, etc. After the engine has warmed up sufficiently to run at idle wthout stalling, automatically operable thermostatic devices are provided to divert a portion of the airflow from the fan from the area of the carburetors to the rear of the vehicle.

I have found that the control means provided for this purpose, a pair of dampers, is inadequate in that it does not restrict the flow of heated air around the carburetors sufficiently under driving conditions in warm climates. The result is, the engine runs hot, idling is rough, stalling is frequent, oil pressure tends to fall off, and gasoline and oil consumption is excessive.

My improved shutter is easily installed with simple tools and entirely eliminates the objectionable characteristics above set forth.

The object of my invention, therefore, is to provide a simple, cheap shutter which may be quickly installed in Corvair automobiles, or in other places where like engines are used, and which modifies the circulation of air around the engine such that the engine performance is substantially improved.

This will be more fully understood and appreciated from the following description of a preferred embodiment of the invention, with reference to the accompanying drawings.

In the drawings:

FIGURE 1 is a sectional view through one of the air circulating ducts in the Corvair automobile showing my improved shutter installed therein and with the parts in "cold engine position".

FIGURE 2 is a similar view showing the parts in "hot engine position."

FIGURE 3 is a longitudinal section through the shutter itself.

FIGURE 4 is a plan view of the shutter.

FIGURE 5 is a schematic sectional view of the engine compartment showing the path of air circulation over the various engine components when the engine is "cold"; and FIGURE 6 is a similar view showing the path of air circulation when the engine is "hot."

Referring now to the drawings in detail, it will be seen that the air circulating duct (of which there are two, one on each side of the engine as installed in the vehicle) comprises a sheet metal member 10 suitably formed for mounting in the engine compartment. The duct 10 is open toward the rear as indicated at 12 and has a baffle 14 at the bottom as will be further explained.

An opening 16 is provided at the top of the duct with a bent-down flange 18 at the rear as will be seen from the drawing. Mounted in the duct is a damper 20. This damper has a pair of attached tabs 22, only one of which is shown, which secure the damper to a rod 24 for swinging movement about the axis of the rod. The ends of the rod 24 are pivotally mounted in the sheet metal framing in the engine compartment, the details of the mounting being omitted for purposes of simplification. A second attached tab 26 carries a stud 28 which threadedly engages a rod 30. The latter is secured at its other end to the operating element of a thermostat 32 which is mounted in the airstream of the engine air circulation system by means of a bracket 34.

As so far described, the parts are standard on most models of the Corvair automobile produced in recent years. It will be seen that when the engine is cold, the thermostat 32 moves the damper 20 to FIGURES 1 and 5 position and the airflow from the fan (not shown) is directed upwardly in the direction of the arrows where it circulates around the carburetor, oil cooler and oil filter. The damper 20 engages the flange 18 and the baffle 14 in this position and effectively seals off the airflow rearwardly of the compartment.

As the engine warms up, the thermostat 32, which is in the airstream, acts to move the damper 20 in clockwise direction about the axis of rod 30 thus opening the rear of the duct to permit the air to flow rearwardly of the compartment as indicated in FIGURES 2 and 6. When the engine has reached normal operating temperature, the damper 20 will be in the position shown in FIGURES 2 and 6.

As explained above, this action of the damper 20 does not provide satisfactory air distribution under many operating conditions principally because a certain portion of the airstream can still flow upwardly through the opening 16 and around the carburetor.

I have provided a shutter 36 (shown in detail in FIGURES 3 and 4) which is attached to the top edge of the damper 20 in the position shown for the purpose of modifying the airflow in a highly beneficial manner.

The shutter consists of a rectangular piece of metal, preferably spring steel, shaped to suitable configuration such that it will engage the upper wall of the duct 10 at an intermediate point when in closed position (FIG. 1) and at a point adjacent one end when in open position (FIG. 2). The shutter is provided with an opening 38 of substantial size, and one edge is formed into a spring clip 40 for engagement with the rear edge of the damper 20.

The shutter is mounted on the damper simply by engaging the clip portion 40 over the edge of the damper and tapping with a hammer. If desired, the parallel sections of the shutter can be hit with a punch to assure good adherence to the marginal edge portion of the damper.

The improvement in control of the engine cooling airstream by the addition of the shutter will be now apparent. Because of the opening 38 in the shutter, no impediment is offered to flow of air upwardly when the damper is in the cold position of FIGURES 1 and 5 or in the hot position of FIGURES 2 and 6. However, when the damper is in its hot position, as shown in FIGURES 2 and 6, it will be seen that flow of hot air is completely cut off from the area of the carburetor, oil cooler and oil filter, and in addition a flow of cool air is induced through this area and downwardly through the opening 16 as illustrated in FIGURES 2 and 6.

Thus it will be seen that with my invention, all of the advantages of the standard Corvair air circulation system, i.e. quick engine warmup, prevention of carburetor icing, etc., are preserved; and when the engine has reached its normal operating temperature, the hot air is diverted from flow around the carburetor, oil filter and oil cooler, such that these elements are cooled rather than receiving additional heat at a time when such heat is detrimental to engine operation and economy. This is particularly true in hot climates and in cars with air conditioning, and when the engine is subjected to idling for sustained periods.

As a result, the addition of a pair of shutters to the regular Corvair dampers, in accordance with my invention, will immediately effect an improvement in the idling characteristics of the engine, will reduce stalling, will improve gasoline and oil mileage, and provides an increase in power.

It will be understood that the damper and shutter assembly will assume intermediate positions between those shown in accordance with movement of the thermostat 32 under the influence of engine heat.

While I have shown and described my invention as applied to a Corvair automobile, it will be understood that it is not limited to such use, but may be applied to any engine installation where similar problems of air circulation exist.

I claim:

1. In an engine compartment, a housing through which engine cooling air is circulated, said housing having a first opening through which a moving airstream heated by passing around the engine may be directed over the engine carburetor and a second opening through which said airstream may be directed outwardly of said housing, a damper mounted in said housing for movement between a first position closing said second opening and a second position opening said second opening, a shutter carried by said damper and extending angularly therefrom, said shutter having an aperture through which said airstream may flow in either position of said damper and a solid portion which deflects said airstream from said first opening when said damper is in second position.

2. The combination of claim 1 wherein said shutter is constructed and arranged such that a flow of air is induced into said housing through said first opening when said damper is in its second position.

3. The combination of claim 2 wherein thermostatic means operable in response to the temperature of said airstream is operatively connected to said damper.

4. The combination of claim 1 wherein thermostatic means operable in response to the temperature of said airstream is operatively connected to said damper.

5. In combination with an engine cooling air circulation duct, an opening in the wall of said duct, a movable damper mounted in said duct adapted for movement between one position closing said duct to through air circulation and a second position opening said duct to through air circulation, a shutter carried by said damper and extending angularly therefrom in such position that the circulating airstream is deflected from flow through said opening when said damper is in said second position.

6. The combination of claim 5 wherein said shutter extends from the trailing edge of said damper angularly toward the leading edge thereof and in spaced relationship thereto such that said shutter engages the inner wall of said duct adjacent said opening when said damper is in said second position.

7. The combination of claim 5 wherein said shutter comprises a substantially rectangular section having a spring clip at one edge for attachment to the trailing edge of said damper and an aperture adjacent said clip.

8. As a new article of manufacture, an air shutter adapted to be attached to the air damper in the engine compartment of Corvair automobiles comprising a rectangular section of material having a spring clip along one edge, an aperture in said section adjacent said clip, said section being bent at an obtuse angle relative to the plane of the aperture.

References Cited in the file of this patent

UNITED STATES PATENTS 2,334,561     Kopplin _____ Nov. 16, 1943